Dec. 21, 1965 J. Y. IZUMI 3,224,097
GEOMETRIC INSTRUMENT
Filed May 31, 1963

Inventor:
John Y. Izumi.
By Merriam, Smith & Marshall
Attys

United States Patent Office 3,224,097
Patented Dec. 21, 1965

3,224,097
GEOMETRIC INSTRUMENT
John Y. Izumi, 105 E. Ohio St., Chicago, Ill.
Filed May 31, 1963, Ser. No. 284,419
1 Claim. (Cl. 33—1)

This invention relates to geometric apparatus particularly suitable for trisecting any given angle. The device herein disclosed insures precision of measurement and instantaneous results which may be utilized by any person, skilled or not, who follows simple directives and layout.

The angle measuring device herein disclosed is one by which either multiple angles or the reverse may readily be achieved by the mere movement and positioning of indicating devices slidable and rotatable relative to each other.

The invention has been illustrated in one of its preferred forms by the accompanying drawings in which.

Figure 1:
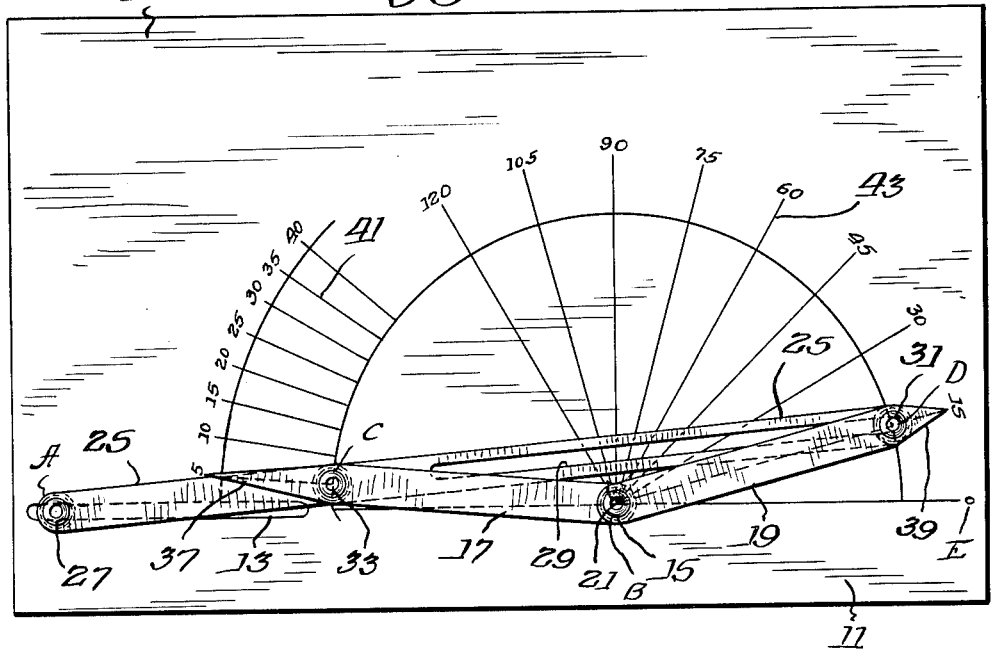
FIG. 1 represents a plan view of the instrument as ready for use.
Figure 2:
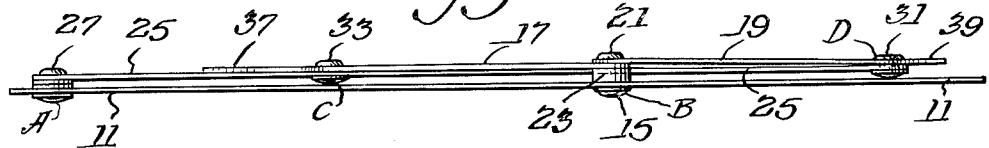
FIG. 2 is an edge view of the instrument of FIG. 1 showing the relative location of the various component elements relative to each other.

Referring now to the drawings, the instrument consists essentially of a base plate 11 provided with an elongated slot 13 preferably extending parallel to one edge of the base and in a path parallel to the diameter of a circle representing angular divisions between 0° and 180°. At a point 15 in alignment with the center of the slot and also on the diameter of the circle between the points 0° and 180°, a plurality of link members 17 and 19 is secured for pivotal movement. The links 17 and 19 are held together illustratively by a suitable rivet member 21 extending through the opening 15. These elements are spaced from the base plate in any desired fashion, such as by the spacer washer schematically shown at 23.

An elongated guide member 25 is slidably held at one end 27 to move back and forth longitudinally within the slot 13. At the outer region of the guide member 25 there is a long slot 29 which is terminated just short of the end of the guide. The link 19 is slidably held by the pin member 31 within the slot 29 so that with arcuate movement of the guide member 25 about the attachment point 27 as a pivot and, of course, with slidable movement of the pivot point within the slot 13, the links 17 and 19 are adapted to turn about the point 15 as a center and to move along the slot to point to different angular positions relative to the direction of the slot 13.

The link 17, which is pivotally secured to the base 11, also is pivotally secured to the guide member 25 at the pivot point 33 by means of a suitable rivet and washer so that, with turning of the guide 25 about the pivot point 27, the connection point 33 follows a circle or orbital path about the center point 15 and simultaneously the pivot point 27 slides along the slot 13. Under these circumstances, the guide pin 31, which fastens the link 19 within the slot 29, moves longitudinally along the slot and, with this movement, the link turns about the point 15 as a center. The outer ends of the links 17 and 19 terminate in pointers 37 and 39 so that, with movement, the outer ends of the pointers may be directed to different scale identifications. In this sense, the pointer 37, which is adapted to indicate a selected position on the scale 41 representing the divided angle, extends a greater distance from the center 15 than does the pointer 39 which is adapted to traverse the scale 43 and indicate the multiplied angle or the angle which is to be divided.

The length of the links 17 and 19 between the pivot point 15 and the pivot points 33 or 31, as the case may be, is equal. Likewise, the length along the guide member 25 between the pivot point 27 about which sliding movement within the slot 13 occurs and the connection of the link 17 at the pivot point 33 is also identical.

Figure 4:
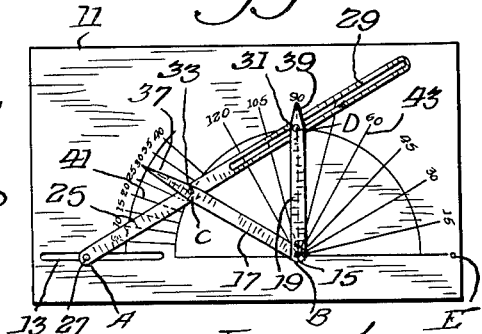

If now, for instance, it be desired to provide an indication of the angle which would be represented by trisecting the angle 90° (see FIG. 4), the point 39 on the link 19 is turned by sliding the link through the slot 29 until point 39 is above the designation 90° on the scale 43. This condition having been obtained, the link 17 will have been moved to the position indicated, as in FIG. 4, where the pointer 37 is opposite and designates the position as 30° on the scale 41. At this time the movement of the guide 17 within the slot 13 may have been either from right to left within the slots or vice versa, depending upon its previous position.

Figure 3:
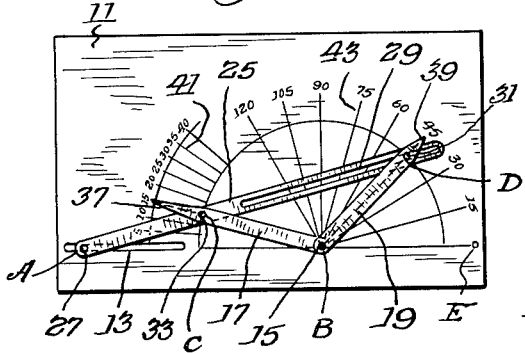
FIG. 3 and FIG. 4 are largely diagrammatic views to show the instrument used either to divide or multiply angles for ready observation.

As a further illustration of the operation, reference may be made to FIG. 3 where the pointer 37 on the link 17 illustratively points to the position 15° on the scale 41. If it be the objective to multiply the angle, the positioning of the pointer 37 will move the remaining link 19 within the guide 25 so that pointer 39 is opposite the designation 45° on the scale 43. In this instance, it will be apparent that the angle 45° is three times the angle 15° or, vice versa, that the angle 15° represents the trisection of the angle 45° in the event that the pointer has been moved to the 45° position.

The proof of the operation above set forth may be found in the following:

Sides $AC=BC=BD$
$\angle ACB = 180° - 2\angle CAB = 180° - 2\angle CBA$
$\angle CBA + \angle CBD + \angle DBE = 180°$
$\angle CBA + 180° - 2\angle BCD + \angle DBE = 180°$
$\angle CBA - 2\angle BCD + \angle DBE = 0$ In triangle $CAB$,
$$\angle ACB = 180° - 2\angle CAB$$
$$= 180° - 2\angle CBA$$

In straighter line $ACD$,
$$\angle ACB = 180° - \angle BCD$$

Therefore
$$180° - 2\angle CAB = 180° - BCD$$
and $2\angle CAB = BCD$
Therefore $\angle DBE = 3\angle CBA$
and $\angle DBE = 3\angle CAB$ The device, as above described, provides a ready means, without mental effort, to identify multiple angles or to trisect angles as desired. The arrangement provides an accurate representation and is such that the angle desired can readily be read in such a fashion as to be usable immediately for all of draftsmen, engineers, students and the like. Other modifications may be made, of course, without departing from the spirit and scope of what is disclosed and recourse may be had to any changes which fall within the spirit and scope of what is hereinafter claimed.

Having now described the invention, what is claimed is:

A geometric instrument for measuring angles comprising a base having a slot extending therealong in a straight path, a guide member having one end secured within the slot and adapted for both rotational movement and longitudinal movement therealong, the said guide member having an elongated slot extending inwardly thereof from its outer free end toward the point of slide connection within the base member slot, a pair of equal-length link members each having one end pivotally connected to the base member at a common point for turning relative thereto, one of said link members being pivotally connected to the guide member at a point on the guide member inwardly of the slot and spaced from the point of pivotal connection of the guide member within the slot by a distance which corresponds to the length of the first link from its point of connection of the first link to the guide member, the second link member having its outer end connected for slidable movement within the slot of the guide member, and indicator means extending outwardly from the end of each of the link members for indicating the instantaneous angular position thereof relative to a reference line extending through the length of the slot in the base member and the point of pivotal connection of the said links whereby with rotation of the links one end of one link slides within the slotted portion of the guide means and simultaneously the slidable connection of the guide means moves within the slot so that the pointer associated with one link indicates an angular position relative to the path of the base slot which is three times the angle indicated by the other indicating means.

References Cited by the Examiner
UNITED STATES PATENTS

| | | | |
|---|---|---|---|
| 1,010,612 | 12/1911 | Garinger | 33—27 |
| 1,145,369 | 7/1915 | Kaplan | 33—91 |

FOREIGN PATENTS

| | | |
|---|---|---|
| 66,217 | 12/1892 | Germany. |
| 261,840 | 12/1928 | Italy. |

ISAAC LISANN, *Primary Examiner.*

UNITED STATES PATENT OFFICE
CERTIFICATE OF CORRECTION

Patent No. 3,224,097 December 21, 1965

John Y. Izumi

It is hereby certified that error appears in the above numbered patent requiring correction and that the said Letters Patent should read as corrected below.

Column 2, lines 44 and 45, for "BCD", each occurrence, read -- ∠BCD --.

Signed and sealed this 13th day of December 1966.

(SEAL)
Attest:

ERNEST W. SWIDER
Attesting Officer

EDWARD J. BRENNER
Commissioner of Patents